(12) United States Patent  (10) Patent No.: US 8,455,581 B2
Feldermann et al.  (45) Date of Patent: Jun. 4, 2013

(54) ANTISTATIC POLYCARBONATE MOULDING COMPOSITIONS

(75) Inventors: Achim Feldermann, Duesseldorf (DE); Andreas Seidel, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 13/331,988

(22) Filed: Dec. 20, 2011

(65) Prior Publication Data
US 2012/0165442 A1  Jun. 28, 2012

(30) Foreign Application Priority Data
Dec. 23, 2010  (EP) .................................... 10196931

(51) Int. Cl.
*C08K 3/32* (2006.01)
(52) U.S. Cl.
USPC ............ 524/417; 524/320; 524/321; 524/414
(58) Field of Classification Search
USPC ................................. 524/320, 321, 414, 417
See application file for complete search history.

(56) References Cited

U.S. PATENT DOCUMENTS

| | | | |
|---|---|---|---|
| 4,381,359 | A | 4/1983 | Idel et al. |
| 6,706,851 | B1 | 3/2004 | Linemann et al. |
| 6,784,257 | B2 | 8/2004 | Hilgers et al. |
| 6,913,804 | B2 | 7/2005 | Lacroix et al. |
| 2008/0258338 | A1 * | 10/2008 | Seidel et al. .................. 264/255 |

FOREIGN PATENT DOCUMENTS

| | | |
|---|---|---|
| EP | 0023291 | 2/1981 |
| EP | 0 613 919 | 7/1994 |
| EP | 2256165 | 12/2010 |
| JP | 53094364 | 8/1978 |
| JP | 9-137053 | 5/1997 |
| WO | 2004/060997 | 7/2004 |

OTHER PUBLICATIONS

European Search Report dated May 20, 2011 in EP Application 10196931.9 (6 pages).

International Search Report and Written Opinion dated Mar. 12, 2012 in PCT/EP2011/073274 (12 pages).

Database WPI, Week 197838, Thompson Scientific, London GB, AN 1978-67934A, XP002636609 (1 page).

* cited by examiner

*Primary Examiner* — Peter Szekely
(74) *Attorney, Agent, or Firm* — Baker Donelson Bearman Caldwell & Berkowitz, PC

(57) ABSTRACT

Polymer compositions containing
A) at least one compound selected from the group consisting of polycarbonate, polyester and polyester carbonate,
B) optionally one or more optionally rubber-modified vinyl (co)polymers,
C) at least one compound selected from the group consisting of polyether amides, polyester amides and polyether ester amides,
D) at least one Brönstedt-acidic compound selected from the group consisting of organic fruit acids, inorganic acidic phosphorus compounds and compounds of formula IV

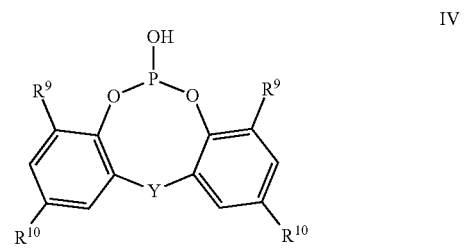

IV wherein
$R^9$ and $R^{10}$ independently of one another denote $C_1$- to $C_9$-alkyl, optionally substituted $C_5$- to $C_6$-cycloalkyl, $C_6$- to $C_{10}$-aryl or $C_7$- to $C_{12}$-aralkyl, and
Y denotes S or $CZ^1Z^2$, wherein $Z^1$ and $Z^2$ independently of one another represent H, $C_1$- to $C_6$-alkyl, cyclohexenyl or cyclohexyl,
and
E) optionally further additives
have permanent antistatic behavior and have improved heat distortion resistance, low-temperature strength, processing stability, stress cracking resistance and, in particular, hydrolytic stability.

14 Claims, No Drawings

ANTISTATIC POLYCARBONATE MOULDING COMPOSITIONS

CROSS REFERENCE TO RELATED APPLICATION

This application claims priority to European Patent Application No. 10196931.9, filed Dec. 23, 2010, the content of which is incorporated herein by reference in its entirety.

BACKGROUND

1. Field of the Invention

The present invention relates to polycarbonate compositions which have been provided with permanent antistatic properties and which, compared with the prior art, have improved heat distortion resistance, low-temperature strength, processing stability, stress cracking resistance and, in particular, hydrolytic stability. The present invention relates additionally to processes for the preparation of these compositions and to their use.

2. Description of Related Art

The accumulation of dust with the formation of dust figures is a widespread problem in moulded plastics articles. See in this connection, for example, Saechtling, Kunststoff-Taschenbuch, 26th edition, Hanser Verlag, 1995, Munich, p. 140 f. Dust deposits on high-gloss moulded articles are particularly troublesome and functionally limiting. Such dust accumulations are particularly disruptive when the moulded articles are also to be lacquered, so that the dust can adversely affect the optical result.

A known method of reducing the accumulation of dust on plastics articles is the use of antistatic agents. Antistatic agents for thermoplastics which limit the accumulation of dust are described in the literature (see e.g. Gächter, Müller, Plastic Additives, Hanser Verlag, Munich, 1996, p. 749 ff). These antistatic agents reduce the electric surface resistance of the plastics moulding compositions, as a result of which surface charges which form by friction during production and use are better dissipated. Dust particles are accordingly subjected to less electrostatic attraction, and consequently there is less accumulation of dust.

In the case of antistatic agents, a distinction is generally made between internal and external antistatic agents. An external antistatic agent is applied to the moulded plastics article after processing, while an internal antistatic agent is added to the plastics moulding compositions as an additive. The use of internal antistatic agents is usually desirable for economic reasons, because further cost-intensive working steps for the application of the antistatic agent are not required after processing.

A frequently described class of internal antistatic agents in thermoplastics are the salts of long-chained sulfonic acids. In polycarbonate and polyester compositions, however, these compounds, like the long-chained quaternary phosphonium or ammonium salts which are likewise used as antistatic agents, lead to molecular weight degradation of the polymer and hence to an impairment of the application-related properties (heat distortion resistance, stress cracking resistance, ultimate elongation, toughness, etc.) under the thermal load to which they are subjected during their preparation and processing. Such low molecular weight anionic or cationic surface-active antistatic agents, like other low molecular weight non-ionic antistatic agents such as, for example, fatty acid esters, ethoxylated alkylamines, ethoxylated alcohols or diethanolamides, act via their migration to the surface of the plastic, where they attract water from the air, as a result of which the surface conductivity of the plastic is ultimately increased. In this regard, a further disadvantage of these compounds is that these antistatic agents do not develop their action sufficiently under conditions with low atmospheric humidity, the antistatic action does not start immediately after the production of the components and, above all, is not of a permanent nature. In particular, these surface-active antistatic agents can be partly or completely removed from the surface of the component again by cleaning of the surfaces, for example, which ultimately lowers the antistatic action permanently.

Polyether amides, polyester amides or polyether ester amides are likewise known as antistatic agents, these compounds being capable of providing polymer compositions with a permanent antistatic action. Their action is based on the formation of a three-dimensional network of the antistatic agent in the polymer which is to be provided with antistatic properties and which is immiscible with the antistatic agent. Owing to the comparatively high electrical conductivity of the polyether amides, polyester amides and polyether ester amides, there is an immediate and permanent reduction in the electric surface and volume resistance of the polymer which is to be provided with antistatic properties, which reduction occurs even in the case of very low atmospheric humidity and is far less dependent thereon than is the case with the surface-active compounds mentioned above.

EP 613919, U.S. Pat. No. 6,784,257, U.S. Pat. No. 6,706,851 and U.S. Pat. No. 6,913,804 disclose polymer compositions provided with antistatic properties by means of polyether amides, polyester amides or polyether ester amides. The addition of acids is not mentioned in these applications.

A disadvantage of the use of polyether amides, polyester amides and polyether ester amides as antistatic agents in polycarbonate or polyester compositions is that their use under the thermal load to which such compositions are subjected during their preparation and processing leads to molecular weight degradation of the polycarbonate or polyester and accordingly to an impairment of the application-related properties (heat distortion resistance, stress cracking resistance, toughness, processing stability and hydrolytic stability, etc.) of the compositions.

From JP 09137053 A there are known polycarbonate compositions which are provided with antistatic properties by means of polyether amides, polyester amides and/or polyether ester amides and the antistatic properties of which are enhanced by addition of from 0.01 to 10 wt. % of an inorganic or organic electrolyte. There are mentioned as electrolytes inorganic and organic salts and dodecylbenzenesulfonic acid, p-toluenesulfonic acid, dodecyl phenyl ether disulfonic acid, naphthalenesulfonic acid and condensation products thereof with formalin, arylsulfonic acids, alkylsulfonic acids, stearic acid, laurylic acid and polyacrylic acids as well as organic phosphoric acids. In principle, however, the teaching of JP 09137053 A leads away from the use of acids because the results achieved therewith are poorer than the results achieved with the corresponding salts.

SUMMARY

Accordingly, an object of the present invention was to provide polycarbonate compositions having permanent antistatic properties, which are distinguished over the prior art by improved heat distortion resistance, low-temperature strength, processing stability, stress cracking resistance and, in particular, hydrolytic stability.

Surprisingly, it has been found that these and other objects can be fulfilled by providing compositions comprising A) at least one compound selected from the group consisting of polycarbonates, polyesters and polyester carbonates, B) optionally one or more optionally rubber-modified vinyl (co)polymers, C) at least one compound selected from the group consisting of polyether amides, polyester amides and polyether ester amides, D) at least one Brönstedt-acidic compound selected from the group consisting of organic fruit acids, inorganic acidic phosphorus compounds and compounds of formula IV (see below), wherein citric acid is preferably used as the fruit acid, the inorganic acidic phosphorus compounds are preferably selected from the group consisting of phosphoric acid and acidic salts thereof, oligo-/poly-phosphoric acid and acidic salts thereof, phosphorous acid and acidic salts thereof, oligo-/poly-phosphorous acid and acidic salts thereof, and the phosphorous acid ester of bis-(2-hydroxy-3-cyclohexyl-5-methyl-pentyl)-methane according to formula IVb (see below) is preferably used as the compound of formula IV, E) optionally further additives.

DETAILED DESCRIPTION OF A PREFERRED EMBODIMENT

The compositions preferably contain

A) from 10 to 100 parts by weight, preferably from 30 to 98 parts by weight, more preferably from 40 to 80 parts by weight, particularly preferably from 50 to 70 parts by weight, based on the sum of components A and B, of polycarbonate, polyester, polyester carbonate or a mixture thereof, B) from 0 to 90 parts by weight, preferably from 2 to 70 parts by weight, more preferably from 20 to 60 parts by weight, particularly preferably from 30 to 50 parts by weight, based on the sum of components A and B, of one or more optionally rubber-modified vinyl (co)polymers, C) from 0.5 to 20 wt. %, preferably from 1 to 10 wt. %, more preferably from 2 to 8 wt. %, particularly preferably from 2 to 5 wt. %, based on the total composition, of a polyether amide, polyester amide, polyether ester amide or a mixture thereof, D) from 0.001 to 3 wt. %, preferably from 0.01 to 1 wt. %, particularly preferably from 0.05 to 0.5 wt. %, based on the total composition, of at least one Brönstedt-acidic compound selected from the group consisting of organic fruit acids, inorganic acidic phosphorus compounds and compounds of formula IV (see below), wherein citric acid is preferably used as the fruit acid, the inorganic acidic phosphorus compounds are preferably selected from the group consisting of phosphoric acid and acidic salts thereof, oligo-/poly-phosphoric acid and acidic salts thereof, phosphorous acid and acidic salts thereof, oligo-/poly-phosphorous acid and acidic salts thereof, and the phosphorous acid ester of bis-(2-hydroxy-3-cyclohexyl-5-methyl-phenyl)-methane according to formula IVb (see below) is preferably used as the compound of formula IV, and E) from 0 to 30 wt. %, preferably from 0.1 to 20 wt. %, more preferably from 0.2 to 10 wt. %, yet more preferably from 0.3 to 5 wt. % and particularly preferably from 0.6 to 1.2 wt. %, based on the total composition, of one or more polymer additives.

The following compositions are yet more preferred:

Compositions in which components A, B, C and E are present in the above-mentioned amounts and D) is present in an amount of from 0.01 to 3 wt. %, more preferably from 0.05 to 1 wt. %, particularly preferably from 0.1 to 0.5 wt. %, based on the total composition, and D is a fruit acid.

Compositions in which components A, B, C and E are present in the above-mentioned amounts and D) is present in an amount of from 0.01 to 1 wt. %, more preferably from 0.05 to 0.3 wt. %, particularly preferably from 0.1 to 0.2 wt. %, based on the total composition, and D is a compound of formula IV (see below).

Compositions in which components A, B, C and E are present in the above-mentioned amounts and D) is present in an amount of from 0.1 to 3 wt. %, more preferably from 0.3 to 2 wt. %, particularly preferably from 0.5 to 1 wt. %, based on the total composition, and D is an acidic salt of an acid selected from the group consisting of phosphoric acid, oligo-/poly-phosphoric acid, phosphorous acid and oligo-/poly-phosphorous acid.

Compositions in which components A, B, C and E are present in the above-mentioned amounts and D) is present in an amount of from 0.001 to 0.3 wt. %, more preferably from 0.005 to 0.15 wt. %, particularly preferably from 0.01 to 0.05 wt. %, based on the total composition, and D is an acid selected from the group consisting of phosphoric acid, oligo-/poly-phosphoric acid, phosphorous acid and oligo-/poly-phosphorous acid.

The sum of the wt. % of components A and B in the total composition is calculated from the difference of 100 wt. % minus the sum of the wt. % of components C, D and E, and wherein total composition is to be understood as meaning the sum of the wt. % of all the components A+B+C+D+E=100 wt. %.

Component A

Aromatic polycarbonates and/or aromatic polyester carbonates according to component A that are suitable according to the invention are known in the literature or can be prepared by processes known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see e.g. DE-A 3 077 934).

The preparation of aromatic polycarbonates is carried out, for example, by reaction of diphenols with carbonic acid halides, preferably phosgene, and/or with aromatic dicarboxylic acid dihalides, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerisation process by reaction of diphenols with, for example, diphenyl carbonate is also possible.

Diphenols for the preparation of the aromatic polycarbonates and/or aromatic polyester carbonates are preferably those of formula (I)

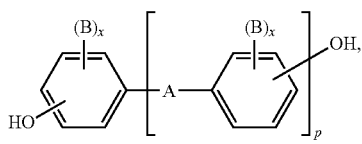

wherein

A is a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which further aromatic rings optionally containing heteroatoms can be fused, or a radical of formula (II) or (III)

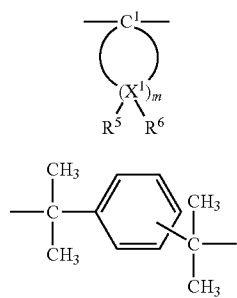

B is in each case $C_1$- to $C_{12}$-alkyl, preferably methyl, halogen, preferably chlorine and/or bromine, x each independently of the other is 0, 1 or 2, p is 1 or 0, and $R^5$ and $R^6$ can be chosen individually for each $X^1$ and each independently of the other is hydrogen or $C_1$ to $C_6$-alkyl, preferably hydrogen, methyl or ethyl, $X^1$ is carbon and m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropyl-benzenes, and derivatives thereof brominated and/or chlorinated on the ring.

Particularly preferred diphenols are 4,4'-dihydroxydiphenyl, bisphenol A, 2,4-bis(4-hydroxy-phenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenylsulfone and di- and tetra-brominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols can be used on their own or in the form of arbitrary mixtures. The diphenols are known in the literature or are obtainable according to processes known in the literature.

Chain terminators suitable for the preparation of thermoplastic aromatic polycarbonates are, for example, phenol, p-chlorophenol, p-tert-butylphenol or 2,4,6-tribromophenol, but also long-chained alkylphenols, such as 4-[2-(2,4,4-trimethylpentyl)]-phenol, 4-(1,3-tetramethylbutyl)-phenol according to DE-A 2 842 005 or monoalkylphenol or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates have mean weight-average molecular weights ($M_w$, measured, for example, by GPC, ultracentrifuge or scattered light measurement) of from 10,000 to 200,000 g/mol, preferably from 15,000 to 80,000 g/mol, particularly preferably from 24,000 to 32,000 g/mol.

The thermoplastic aromatic polycarbonates can be branched in a known manner, preferably by the incorporation of from 0.05 to 2.0 mol %, based on the sum of the diphenols used, of compounds having a functionality of three or more than three, for example those having three or more phenolic groups.

Both homopolycarbonates and copolycarbonates are suitable. For the preparation of copolycarbonates of component A according to the invention it is also possible to use from 1 to 25 wt. %, preferably from 2.5 to 25 wt. %, based on the total amount of diphenols to be used, of polydiorganosiloxanes having hydroxyaryloxy end groups. These are known (U.S. Pat. No. 3,419,634) and can be prepared according to processes known in the literature. The preparation of copolycarbonates containing polydiorganosiloxanes is described in DE-A 3 334 782.

Preferred polycarbonates in addition to the bisphenol A homopolycarbonates are the copolycarbonates of bisphenol A with up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of from 1:20 to 20:1 are particularly preferred.

In the preparation of polyester carbonates, a carbonic acid halide, preferably phosgene, is additionally used concomitantly as bifunctional acid derivative.

Suitable chain terminators for the preparation of the aromatic polyester carbonates, in addition to the monophenols already mentioned, are also the chlorocarbonic acid esters thereof and the acid chlorides of aromatic monocarboxylic acids, which can optionally be substituted by $C_1$- to $C_{22}$-alkyl groups or by halogen atoms, as well as aliphatic $C_2$- to $C_{22}$-monocarboxylic acid chlorides.

The amount of chain terminators is in each case from 0.1 to 10 mol %, based in the case of phenolic chain terminators on moles of diphenol and in the case of monocarboxylic acid chloride chain terminators on moles of dicarboxylic acid dichloride.

The aromatic polyester carbonates can also contain aromatic hydroxycarboxylic acids incorporated therein.

The aromatic polyester carbonates can be both linear and branched in known manner (see in this connection DE-A 2 940 024 and DE-A 3 007 934).

There can be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4 dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on diphenols used. Phenolic branching agents can be placed in a vessel with the diphenols; acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks or distributed randomly.

The relative solution viscosity ($\eta_{rel}$) of the aromatic polycarbonates and polyester carbonates is in the range from 1.18 to 1.4, preferably from 1.20 to 1.32 (measured on solutions of 0.5 g of polycarbonate or polyester carbonate in 100 ml of methylene chloride solution at 25° C.).

Thermoplastic polyesters according to component A which can be used according to the invention are preferably polyalkylene terephthalates, which can be prepared by methods known in the literature (see e.g. Kunststoff-Handbuch, Volume VIII, p. 695 ff, Carl-Hanser-Verlag, Munich 1973).

The polyalkylene terephthalates according to component A are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 wt. %, based on the diol component, of ethylene glycol and/or 1,4-butanediol radicals.

The preferred polyalkylene terephthalates can contain, in addition to terephthalic acid radicals, up to 20 mol %, preferably up to 10 mol %, of radicals of other aromatic or cycloaliphatic dicarboxylic acids having from 8 to 14 carbon atoms or aliphatic dicarboxylic acids having from 4 to 12 carbon atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates can contain, in addition to ethylene glycol or 1,3-propanediol or 1,4-butanediol radicals, up to 20 mol % of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-methyl-2,4-pentanediol, 2-methyl-2,4-pentanediol, 2,2,4-trimethyl-1,3-pentanediol and 2-ethyl-1,6-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane (DE-A 24 07 674, 24 07 776, 27 15 932).

The polyalkylene terephthalates can be branched by incorporation of relatively small amounts of tri- or tetra-hydric alcohols or tri- or tetra-basic carboxylic acids, for example according to DE-A 1 900 270 and U.S. Pat. No. 3,692,744. Examples of preferred branching agents are trimesic acid, trimellitic acid, trimethylol-ethane and -propane and pentaerythritol.

Particular preference is given to polyalkylene terephthalates which have been prepared solely from terephthalic acid and its reactive derivatives (e.g. its dialkyl esters) and ethylene glycol and/or 1,4-butanediol, and mixtures of these polyalkylene terephthalates.

Mixtures of polyalkylene terephthalates contain from 1 to 50 wt. %, preferably from 1 to 30 wt. %, polyethylene terephthalate and from 50 to 99 wt. %, preferably from 70 to 99 wt. %, polybutylene terephthalate.

The polyalkylene terephthalates that are preferably used generally have a limiting viscosity of from 0.4 to 1.5 dl/g, preferably from 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, Volume VIII, p. 695 ff, Carl-Hanser-Verlag, Munich 1973).

The thermoplastic aromatic polycarbonates, polyester carbonates and polyesters can be used on their own or in an arbitrary mixture.

Component B

Rubber-modified vinyl (co)polymers which can be used according to the invention as component B are one or more graft polymers of B.1 preferably from 5 to 95 wt. %, particularly preferably from 10 to 90 wt. %, based on the rubber-modified vinyl (co)polymer, of at least one vinyl monomer on B.2 preferably from 95 to 5 wt. %, particularly preferably from 90 to 10 wt. %, based on the rubber-modified vinyl (co)polymer, of one or more rubber-elastic graft bases.

The graft bases B.2 preferably have glass transition temperatures <10° C., more preferably of <0° C., particularly preferably <−20° C.

Unless expressly described otherwise in the present invention, the glass transition temperature is determined for all components by means of differential scanning calorimetry (DSC) according to DIN EN 61006 at a heating rate of 10 K/min with determination of the Tg as the mid-point temperature (tangent method).

The graft base B.2 generally has a mean particle size (d50 value) of from 0.05 to 10.00 μm, preferably from 0.10 to 5.00 μm, more preferably from 0.15 to 1.00 μm and particularly preferably from 0.2 to 0.7 μm.

The mean particle size d50 is the diameter above and below which in each case 50 wt. % of the particles lie. It can be determined by means of ultracentrifuge measurement (W. Scholtan, H. Lange, Kolloid, Z. and Z. Polymere 250 (1972), 782-1796).

Monomers B.1 are preferably mixtures of

B.1.1 from 50 to 99 parts by weight of vinyl aromatic compounds and/or vinyl aromatic compounds substituted on the ring (such as styrene, α-methylstyrene, p-methylstyrene, p-chlorostyrene) and/or (meth)acrylic acid (C1-C8)-alkyl esters, such as methyl methacrylate, ethyl methacrylate, and B.1.2 from 1 to 50 parts by weight of vinyl cyanides (unsaturated nitriles such as acrylonitrile and methacrylonitrile) and/or (meth)acrylic acid (C1-C8)-alkyl esters, such as methyl methacrylate, n-butyl acrylate, tert-butyl acrylate, and/or derivatives (such as anhydrides and imides) of unsaturated carboxylic acids, for example maleic anhydride.

Preferred monomers B.1.1 are selected from at least one of the monomers styrene, α-methylstyrene and methyl methacrylate, preferred monomers B.1.2 are selected from at least one of the monomers acrylonitrile, maleic anhydride and methyl methacrylate. Particularly preferred monomers are B.1.1 styrene and B.1.2 acrylonitrile or, in an alternative embodiment, B.1.1=B.1.2 methyl methacrylate.

Graft bases B.2 suitable for the graft polymers according to component B are, for example, diene rubbers, EP(D)M rubbers, that is to say those based on ethylene/propylene and optionally diene, acrylate, polyurethane, silicone, chloroprene, ethylene/vinyl acetate and acrylate-silicone composite rubbers.

Preferred graft bases B.2 are diene rubbers, for example based on butadiene and isoprene, or mixtures of diene rubbers or copolymers of diene rubbers or mixtures thereof with further copolymerisable monomers (e.g. according to B.1.1 and B.1.2), with the proviso that the glass transition temperature of component B.2 is below <10° C., preferably <0° C., particularly preferably <−10° C.

Pure polybutadiene rubber is particularly preferred. In a further preferred embodiment, B.2 is styrene-butadiene block copolymer rubber.

The gel content of the graft base B.2 is at least 30 wt. %, preferably at least 40 wt. %, particularly preferably at least 70 wt. % (measured in toluene).

The gel content of the graft base B.2 and of component B is determined at 25° C. in a suitable solvent (M. Hoffmann, H. Krömer, R. Kuhn, Polymeranalytik I and II, Georg Thieme-Verlag, Stuttgart 1977).

Particularly preferred rubber-modified vinyl (co)polymers according to component B are, for example, ABS polymers (emulsion, mass and suspension ABS), as are described, for example, in DE-OS 2 035 390 (=U.S. Pat. No. 3,644,574) or in DE-OS 2 248 242 (=GB-PS 1 409 275) or in Ullmanns, Enzyklopädie der Technischen Chemie, Vol. 19 (1980), p. 280 ff. The graft copolymers according to component B are prepared by radical polymerisation, for example by emulsion, suspension, solution or mass polymerisation, preferably by emulsion or mass polymerisation, particularly preferably by emulsion polymerisation.

In a particularly preferred embodiment, component B contains a mixture of a rubber-modified vinyl (co)polymer prepared by emulsion polymerisation and a further rubber-modified vinyl (co)polymer prepared by mass polymerisation.

Particularly suitable graft rubbers are also ABS polymers which are prepared by the emulsion polymerisation process by redox initiation with an initiator system comprising organic hydroperoxide and ascorbic acid according to U.S. Pat. No. 4,937,285.

Because it is known that, in the graft reaction, the graft monomers are not necessarily grafted onto the graft base completely, rubber-modified graft polymers according to component B are also understood according to the invention as being those products which are obtained by (co)polymerisation of the graft monomers B.1 in the presence of the graft base B.2 and which also form during working up.

Acrylate rubbers suitable as the graft base B.2 are preferably polymers of acrylic acid alkyl esters, optionally with up to 40 wt. %, based on B.2, of other polymerisable, ethylenically unsaturated monomers. The preferred polymerisable acrylic acid esters include C1- to C8-alkyl esters, for example methyl, ethyl, butyl, n-octyl and 2-ethylhexyl esters; haloalkyl esters, preferably halo-C1-C8-alkyl esters, such as chloroethyl acrylate, as well as mixtures of these monomers.

For crosslinking, monomers having more than one polymerisable double bond can be copolymerised. Preferred examples of crosslinking monomers are esters of unsaturated monocarboxylic acids having from 3 to 8 carbon atoms and unsaturated monohydric alcohols having from 3 to 12 carbon atoms or saturated polyols having from 2 to 4 OH groups and from 2 to 20 carbon atoms, such as ethylene glycol dimethacrylate, allyl methacrylate; polyunsaturated heterocyclic compounds, such as trivinyl and triallyl cyanurate; polyfunctional vinyl compounds, such as di- and tri-vinylbenzenes; but also triallyl phosphate and diallyl phthalate. Preferred crosslinking monomers are allyl methacrylate, ethylene glycol dimethacrylate, diallyl phthalate, and heterocyclic compounds which contain at least three ethylenically unsaturated groups. Particularly preferred crosslinking monomers are the cyclic monomers triallyl cyanurate, triallyl isocyanurate, triacryloyl-hexahydro-s-triazine, triallyl benzenes. The amount of crosslinked monomers is preferably from 0.02 to 5.00 wt. %, in particular from 0.05 to 2.00 wt. %, based on the graft base B.2. In the case of cyclic crosslinking monomers having at least three ethylenically unsaturated groups, it is advantageous to limit the amount to less than 1 wt. % of the graft base B.2.

Preferred "other" polymerisable, ethylenically unsaturated monomers which can optionally be used in addition to the acrylic acid esters for the preparation of acrylate rubbers suitable as the graft base B.2 are, for example, acrylonitrile, styrene, α-methylstyrene, acrylamides, vinyl C1-C6-alkyl ethers, methyl methacrylate, butadiene. Preferred acrylate rubbers as the graft base B.2 are emulsion polymers having a gel content of at least 60 wt. %.

Further suitable graft bases according to B.2 are silicone rubbers having graft-active sites, as are described in DE-OS 3 704 657, DE-OS 3 704 655, DE-OS 3 631 540 and DE-OS 3 631 539.

Rubber-free vinyl (co)polymers which can be used according to the invention as component B are, for example and preferably, homo- and/or co-polymers of at least one monomer from the group of the vinyl aromatic compounds, vinyl cyanides (unsaturated nitriles), (meth)acrylic acid (C1-C8)-alkyl esters, unsaturated carboxylic acids, as well as derivatives (such as anhydrides and imides) of unsaturated carboxylic acids.

Particularly suitable are (co)polymers of from 50 to 99 parts by weight, preferably from 60 to 80 parts by weight, in particular from 70 to 80 parts by weight, in each case based on the (co)polymer, of at least one monomer selected from the group of the vinyl aromatic compounds (such as, for example, styrene, α-methylstyrene), vinyl aromatic compounds substituted on the ring (such as, for example, p-methylstyrene, p-chlorostyrene) and (meth)acrylic acid (C1-C8)-alkyl esters (such as, for example, methyl methacrylate, n-butyl acrylate, tert-butyl acrylate), and from 1 to 50 parts by weight, preferably from 20 to 40 parts by weight, in particular from 20 to 30 parts by weight, in each case based on the (co)polymer, of at least one monomer selected from the group of the vinyl cyanides (such as, for example, unsaturated nitriles such as acrylonitrile and methacrylonitrile), (meth)acrylic acid (C1-C8)-alkyl esters (such as, for example, methyl methacrylate, n-butyl acrylate, tert-butyl acrylate), unsaturated carboxylic acids and derivatives of unsaturated carboxylic acids (for example maleic anhydride and N-phenyl-maleimide). The copolymer of styrene and acrylonitrile is particularly preferred.

Such vinyl (co)polymers are known and can be prepared by radical polymerisation, in particular by emulsion, suspension, solution or mass polymerisation.

Within the context of the present invention, the term "C1-CX" is to be understood as meaning all hydrocarbons or hydrocarbon radicals which have a carbon skeleton with an integer from 1 to X. Where also mentioned, the hydrocarbons can also have other substituents, preferably halogens, more preferably chlorine.

In an embodiment which is particularly preferred according to the invention, the vinyl (co)polymers have a weight-average molar mass $M_w$ (determined by gel chromatography in acetone with polystyrene calibration) of from 50,000 to 250,000 g/mol, particularly preferably from 70,000 to 180,000 g/mol.

In a particular embodiment which is likewise preferred, there is used as component B a mixture of
Ba) a first rubber-modified vinyl (co)polymer,
Bb) a second rubber-modified vinyl (co)polymer, and
Bc) optionally at least one rubber-free vinyl (co)polymer,
wherein in a particularly preferred embodiment the first rubber-modified vinyl (co)polymer Ba) is at least one graft polymer prepared by emulsion polymerisation and the second rubber-modified vinyl (co)polymer Bb) is at least one graft polymer prepared by mass polymerisation.

In this particularly preferred embodiment, component B preferably consists of
Ba) from 10 to 90 parts by weight, preferably from 15 to 50 parts by weight, in particular from 20 to 40 parts by weight, based on component B, of at least one rubber-modified graft polymer prepared by emulsion polymerisation,
Bb) from 10 to 90 parts by weight, preferably from 15 to 50 parts by weight, in particular from 20 to 40 parts by weight, based on component B, of at least one rubber-modified graft polymer prepared by mass polymerisation, and
Bc) from 0 to 80 parts by weight, preferably from 0 to 70 parts by weight, in particular from 20 to 60 parts by weight, based on component B, of at least one rubber-free vinyl (co)polymer,
wherein the sum of the parts by weight of Ba), Bb) and Bc) is 100 parts by weight.

Components Ba, Bb and Bc can also be used as component B in the form of a precompound. It is likewise possible for any desired partial amounts of Ba, Bb and Bc to be used in the form of a precompound. This includes the use of a precompound of Ba or partial amounts thereof with Bb or partial amounts thereof, of a precompound of Ba or partial amounts thereof with Bc or partial amounts thereof, or of a precompound of Bb or partial amounts thereof with Bc or partial amounts thereof. The precompounds can be prepared in any conventional compounding unit, such as, for example, in twin-shaft extruders or kneaders. In a preferred embodiment, the precompounds are prepared in the presence of water, which serves as carrier gas for removing residual monomers and residual solvents, the water being removed from the melt of the precompound again together with the residual monomers and residual solvents in a step of the precompounding process by application of a vacuum, before the precompound is cooled and thereby solidified and subsequently granulated.

In a particular embodiment, the rubber-modified emulsion graft component Ba is used in the moist state as a result of the residual water not being removed or being removed only incompletely from the precipitated emulsion graft before its use in the precompounding process. In a preferred embodiment, component Ba can contain from 1 to 50 wt. %, in particular from 5 to 40 wt. %, residual moisture when used in the precompounding process.

Component C

Component C is a polyamide copolymer selected from the group of the polyether amides, polyester amides and polyether ester amides, or a mixture of a plurality of such compounds.

The polyether amides used according to the invention as component C are preferably polyether block amides (PEBA), which consist of thermoplastic hard segments of polyamide sequences and elastomeric soft segments of polyether sequences, which are linked together by either ester or amide groups. Such polyether block amides are obtained by linking terminally functionalised, preferably terminally carboxylate-functionalised, oligoamides with difunctional oligoethers, preferably with oligoethers having hydroxyl or amino end groups.

The compounds according to component C are known in the literature and disclosed, for example, in U.S. Pat. No. 4,871,804 (Daicel), EP 730005 (General Electric), EP 613919 (Sanyo Kasai), EP 1046675 (Arkema), EP 1155065 (Arkema), EP 1262527 (Arkema) and JP 09137053 (Asahi). The descriptions of the polyamide copolymers disclosed in these applications are incorporated into this application. The polyether amides, polyester amides and polyether ester amides described in these applications are preferred embodiments of component C in the compositions according to the invention of the present application.

Polyether amide block copolymers are particularly preferably used as component C.

Component D

There is used as the Brönstedt acid according to component D at least one Brönstedt-acidic compound selected from the group consisting of organic fruit acids, inorganic acidic phosphorus compounds and compounds of formula IV (see below).

The fruit acids used according to the invention as component D are organic hydroxycarboxylic acids or dicarboxylic acids. The preferred fruit acids include malic acid, citric acid, fumaric acid, gluconic acid, glycolic acid, mandelic acid, lactic acid, oxalic acid, salicylic acid, α-hydroxycaprylic acid and tartaric acid.

Citric acid is a particularly preferred fruit acid.

The inorganic acidic phosphorus compounds are preferably selected from the group consisting of phosphoric acid and acidic salts thereof (that is to say dihydrogen phosphates or monohydrogen phosphates, wherein in a preferred embodiment alkali or alkaline earth ions are used as the cation in the salts), oligo-/poly-phosphoric acid and acidic salts thereof, phosphorous acid and acidic salts thereof (that is to say dihydrogen phosphites or monohydrogen phosphites, wherein in a preferred embodiment alkali or alkaline earth ions are used as the cation in the salts), as well as oligo-/poly-phosphorous acid and acidic salts thereof. In a particularly preferred embodiment, the salts of phosphoric, oligo-/poly-phosphoric, phosphorous and oligo-/poly-phosphorous acid are a sodium, potassium, magnesium or calcium salt.

Phosphoric acid, phosphorous acid and monopotassium dihydrogen phosphate are particularly preferably used as the inorganic acidic phosphorus compound.

In an alternative preferred embodiment of the present invention there are used as component D compounds according to formula (IV)

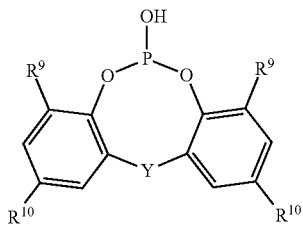

(IV)

wherein $R^9$ and $R^{10}$ independently of one another denote $C_1$- to $C_9$-alkyl, optionally substituted $C_5$- to $C_6$-cycloalkyl, $C_6$- to $C_{10}$-aryl or $C_7$- to $C_{12}$-aralkyl, and Y denotes S or $CZ^1Z^2$, wherein $Z^1$ and $Z^2$ independently of one another represent H, $C_1$- to $C_6$-alkyl, cyclohexenyl or cyclohexyl.

Compounds according to formula (IV) are known and are disclosed, for example, in EP-A 0 023 291.

There are particularly preferably used as component C phosphorous acid esters of bis-(2-hydroxy-3-cyclohexyl-5-methyl-phenyl) sulfide (formula IVa)

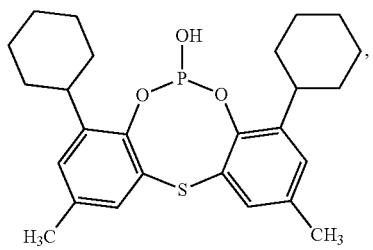

(IVa)

phosphorous acid esters of bis-(2-hydroxy-3-cyclohexyl-5-methyl-phenyl)-methane (formula IVb)

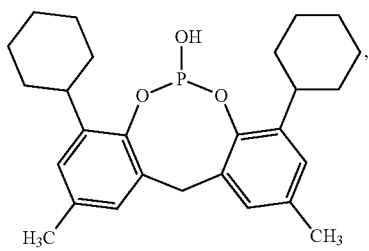

(IVb)

phosphorous acid esters of bis-(2-hydroxy-3-benzyl-5-methyl-phenyl) sulfide (formula IVc)

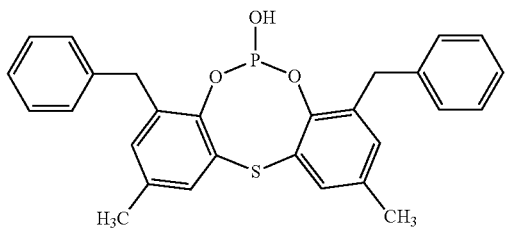

(IVc)

and phosphorous acid esters of bis-(2-hydroxy-3-benzyl-5-methyl-phenyl)-methane (formula IVd)

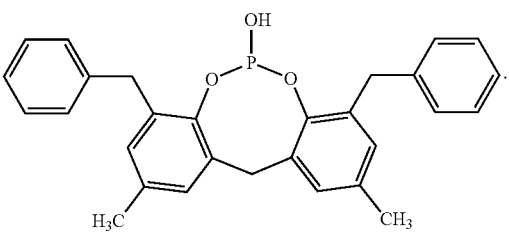

(IVd)

The phosphorous acid ester of bis-(2-hydroxy-3-cyclohexyl-5-methyl-phenyl)-methane according to formula IVb is most particularly preferred.

Component E

The composition can contain further additives as component E. There are suitable as further additives according to component E in particular conventional polymer additives such as flameproofing agents (e.g. organic phosphorus or halogen compounds, in particular bisphenol A-based oligophosphate), antidripping agents (for example compounds of the substance classes of the fluorinated polyolefins, e.g. polytetrafluoroethylene, of the silicones as well as aramid fibres), lubricants and demoulding agents, preferably pentaerythritol tetrastearate, nucleating agents, stabilisers (for example UV, heat and/or hydrolytic stabilisers as well as antioxidants), fillers and reinforcing substances (for example glass or carbon fibres, mica, kaolin, $CaCO_3$, talc and glass flakes) as well as colourings and pigments (for example carbon black, titanium dioxide or iron oxide).

There are used as stabilisers in particular phosphorus-based and/or phenolic stabilisers, preferably tris(2,4-di-tert-butyl-phenyl) phosphite or 2,6-di-tert-butyl-4-(octadecan-oxy-carbonylethyl)phenol and mixtures thereof.

Preparation of the Moulding Compositions and Moulded Bodies

The thermoplastic moulding compositions according to the invention can be prepared, for example, by mixing the respective constituents in a known manner and melt compounding and melt extruding the mixture at temperatures of preferably from 200° C. to 320° C., particularly preferably from 240° C. to 300° C., in conventional devices such as, for example, internal kneaders, extruders and twin-shaft screws.

Mixing of the individual constituents can be carried out, in known manner, either in succession or simultaneously, either at about 20° C. (room temperature) or at a higher temperature.

The invention also provides a process for the preparation of the compositions according to the invention.

The moulding compositions according to the invention can be used in the production of moulded articles of any kind.

These can be produced, for example, by injection moulding, extrusion and blow moulding processes. A further form of processing is the production of moulded articles by deep-drawing from previously produced sheets or films.

Examples of such moulded articles are films, profiles, casing parts of any kind, for example for domestic appliances such as juice extractors, coffee makers, mixers; for office equipment such as monitors, flat screens, notebooks, printers, copiers; sheets, tubes, conduits for electrical installations, windows, doors and further profiles for the construction sector (interior fitting and external applications) as well as parts for electronics and electrical engineering, such as switches, plugs and sockets, and components for commercial vehicles, in particular for the automotive sector. The compositions according to the invention are also suitable for the production of the following moulded articles or mouldings: Parts for the interior finishing of railway vehicles, ships, aircraft, buses and other motor vehicles, bodywork parts for motor vehicles, casings for electrical devices containing small transformers, casings for devices for disseminating and transmitting information, casings and coverings for medical devices, massage devices and casings therefor, toy vehicles for children, prefabricated wall panels, casings for security devices, heat-insulated transport containers, mouldings for sanitary and bathroom fittings, cover grids for ventilator openings, and casings for garden equipment.

In particular, the moulding compositions according to the invention are suitable for the production of permanently antistatic mouldings having a low tendency to attract dust while at the same time having good heat distortion resistance, ultimate elongation, low-temperature strength, processing stability, as well as hydrolytic stability and resistance to chemicals.

The present invention relates also to the use of the described and claimed compositions in the production of moulded articles, and to moulded articles containing one of these compositions.

EXAMPLES

Component A

Linear polycarbonate based on bisphenol A having a relative solution viscosity of $\eta_{rel}=1.306$, measured in dichloromethane as solvent at 25° C. and in a concentration of 0.5 g/100 ml.

Component B

Acrylonitrile-butadiene-styrene (ABS) precompound prepared from 33 wt. % of an ABS graft polymer prepared by the emulsion polymerisation process, 25 wt. % of an ABS graft polymer prepared by the mass polymerisation process and 43 wt. % of a styrene-acrylonitrile copolymer, wherein the ABS precompound has an A:B:S ratio of 18:20:62 wt. % and a gel content of 35 wt. % and the free, that is to say acetone-soluble, styrene-acrylonitrile copolymer in the ABS precompound has a weight-average molecular weight Mw (measured by GPC in acetone as solvent with polystyrene as standard) of 130 kg/mol.

Component C

Pebax MV1074 SP01 (Arkema, France): Polyether amide block copolymer having a nitrogen content of 3.4 wt. % and an acid number of 0.2 mg KOH/g. The polyether phase has a glass transition temperature of −55° C., and the polyamide phase has a melting point of 155° C. The specific electric surface resistance of the polyether amide block copolymer is $3 \times 10^9$ ohms.

Component D-1: Phosphorous acid ester of bis-(2-hydroxy-3-cyclohexyl-5-methyl-phenyl)-methane

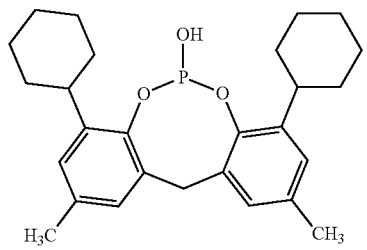 [SMILES: Cc1cc2c(c(C3CCCCC3)c1)OP(O)Oc1c(cc(C)cc1C1CCCCC1)C2]

Component D-2: Anhydrous citric acid
Component D-3: Phosphoric acid $H_3PO_4$
Component D-4: Potassium phosphate $K_3PO_4$
Component D-5: Monopotassium dihydrogen phosphate $KH_2PO_4$
Component D-6: Stearic acid
Component E-1: Pentaerythritol tetrastearate
Component E-2: Irganox® 1076 (2,6-di-tert-butyl-4-(octadecanoxycarbonylethyl)phenol (BASF AG; Ludwigshafen)

Preparation and Testing of the Moulding Compositions According to the Invention

Mixing of the components is carried out on a ZSK-25 twin-screw extruder from Werner & Pfleiderer at a melt temperature of 260° C. and with application of a vacuum of 50 mbar (absolute). The moulded articles are produced on an Arburg 270 E type injection-moulding machine at a melt temperature of 260° C. and a tool temperature of 80° C.

The melt flow rate (MVR) is determined according to ISO 1133 at 260° C. with a die load of 5 kg.

The change in the MVR (ΔMVR) measured according to ISO 1133 at 260° C. with a die load of 5 kg during a 15-minute thermal load at 300° C. is used as a measure of the thermal processing stability of the composition.

The change in the MVR (ΔMVR) measured according to ISO 1133 at 260° C. with a die load of 5 kg after storage of the granules for 7 days at 95° C. and 100% atmospheric humidity is used as a measure of the hydrolytic stability of the composition.

The notched impact strength according to IZOD is determined at −20° C. according to ISO 180-1A on test specimens measuring 80 mm×10 mm×4 mm.

The Vicat B/120 as a measure of the heat distortion resistance is determined according to ISO 306 on test specimens measuring 80 mm×10 mm×4 mm with a die load of 50 N and a heating rate of 120° C./h.

The behaviour in the multiaxial puncture test is used as a measure of the low-temperature ductility in the practice-oriented impact/crash test. The puncture test is carried out at −30° C. in accordance with ISO 6603-2 on test specimens measuring 60 mm×60 mm×2 mm. The fracture patterns of a total of ten test specimens are assessed as to whether a tough or brittle fracture pattern occurs.

The stress cracking behaviour (ESC behaviour) is studied on rods measuring 80 mm×10 mm×4 mm. The test specimens are prestretched by means of a circular arc template (pre-stretch $\epsilon_x=2.4\%$) and stored at room temperature in the test medium rape oil. The stress cracking behaviour is assessed over the time until fracture.

The specific surface resistance is determined according to IEC 60093 on round sheets having a diameter of 60 mm and a thickness of 2 mm. The moulding compositions according to the invention have a specific surface resistance of from $10^8$ to $10^{15}$ ohms, preferably from $10^{12}$ to $10^{15}$ ohms, particularly preferably from $10^{13}$ to $10^{15}$ ohms.

The tendency to attract dust is assessed on round sheets having a diameter of 60 mm and a thickness of 2 mm by exposing the sheets to an atmosphere containing activated charcoal for 10 seconds. The sheets were rubbed beforehand and then (before being exposed to the atmosphere containing activated charcoal) conditioned for 24 hours at 25° C. in air having a relative humidity of 50%.

TABLE 1

Moulding compositions and their properties

| Parts by weight | Comp. 1 | Ex. 1 | Ex. 2 | Ex. 3 | Comp. 2 | Ex. 4 | Ex. 5 | Ex. 6 | Ex. 6a | Ex. 7 | Ex. 8 | Ex. 9 | Comp. 4 | Comp. 5 |
|---|---|---|---|---|---|---|---|---|---|---|---|---|---|---|
| A | 61.50 | 61.50 | 61.50 | 61.50 | 61.50 | 61.50 | 61.50 | 61.50 | 61.50 | 61.50 | 61.50 | 61.50 | 61.50 | 61.50 |
| B | 34.55 | 34.55 | 34.55 | 34.55 | 34.55 | 34.55 | 34.55 | 34.55 | 34.55 | 34.55 | 34.55 | 34.55 | 34.55 | 34.55 |
| C | 2.91 | 2.91 | 2.91 | 2.91 | 2.91 | 2.91 | 2.91 | 2.91 | 2.91 | 2.91 | 2.91 | 2.91 | 2.91 | 2.91 |
| D1 | | 0.10 | 0.20 | 0.50 | 2.00 | | | | | | | | | |
| D2 | | | | | | 0.10 | 0.20 | 0.50 | 2.00 | | | | | |
| D3 | | | | | | | | | | 0.01 | 0.05 | 0.10 | 0.50 | 1.00 |
| E1 | 0.73 | 0.73 | 0.73 | 0.73 | 0.73 | 0.73 | 0.73 | 0.73 | 0.73 | 0.73 | 0.73 | 0.73 | 0.73 | 0.73 |
| E2 | 0.19 | 0.19 | 0.19 | 0.19 | 0.19 | 0.19 | 0.19 | 0.19 | 0.19 | 0.19 | 0.19 | 0.19 | 0.19 | 0.19 |
| Vicat B120 [° C.] | 111 | 120 | 121 | 121 | 117 | 120 | 121 | 119 | 115 | | | | | |
| Notched impact strength at −20° C. [kJ/m$^2$] | 14 | 62 | 73 | 70 | 18 | 66 | 64 | 85 | 36 | | | | | |
| Puncture behaviour at −30° C. [number tough/brittle] | 0/10 | 10/0 | 10/0 | 10/0 | 2/8 | 9/1 | 10/0 | 8/2 | 1/9 | | | | | |
| ΔMVR (300° C./15 min) [260° C./5 kg, cm$^3$/10 min] | n.m* | 40 | 39 | 72 | n.m* | 31 | 21 | 29 | 73 | | | | | |
| ΔMVR (95° C./100% atmospheric humidity/7 days) [260° C./5 kg, cm$^3$/10 min] | n.m* | 11 | 21 | 85 | n.m* | 18 | 17 | 23 | 39 | 13 | 14 | 35 | n.m* | n.m* |
| ESC rape oil 2.4% strain [time to fracture, hh:mm] | 00:15 | 72:00 | 72:00 | 07:00 | 00:27 | 72:00 | 72:00 | 72:00 | 72:00 | | | | | |

| Parts by weight | Comp. 6 | Comp. 7 | Comp. 8 | Comp. 9 | Comp. 10 | Ex. 10 | Ex. 11 | Ex. 12 | Comp. 11 | Comp. 12 | Comp. 13 |
|---|---|---|---|---|---|---|---|---|---|---|---|
| A | 61.50 | 61.50 | 61.50 | 61.50 | 61.50 | 61.50 | 61.50 | 61.50 | 61.50 | 61.50 | 61.50 |
| B | 34.55 | 34.55 | 34.55 | 34.55 | 34.55 | 34.55 | 34.55 | 34.55 | 34.55 | 34.55 | 34.55 |
| C | 2.91 | 2.91 | 2.91 | 2.91 | 2.91 | 2.91 | 2.91 | 2.91 | 2.91 | 2.91 | 2.91 |
| D4 | 0.05 | 0.12 | 0.50 | 1.00 | | | | | | | |
| D5 | | | | | 0.05 | 0.12 | 0.50 | 1.00 | | | |
| D6 | | | | | | | | | 0.12 | 0.50 | 1.00 |
| E1 | 0.73 | 0.73 | 0.73 | 0.73 | 0.73 | 0.73 | 0.73 | 0.73 | 0.73 | 0.73 | 0.73 |
| E2 | 0.19 | 0.19 | 0.19 | 0.19 | 0.19 | 0.19 | 0.19 | 0.19 | 0.19 | 0.19 | 0.19 |
| Notched impact strength at −20° C. [kJ/m$^2$] | 5 | 3 | i.n.p.** | i.n.p.** | 7 | 31 | 54 | 69 | 16 | 11 | 8 |
| Puncture behaviour at −30° C. [number tough/brittle] | 0/10 | 0/10 | i.n.p.** | i.n.p.** | 0/10 | 7/3 | 10/0 | 8/2 | 0/10 | 0/10 | 0/10 |
| ΔMVR (95° C./100% atmospheric humidity/7 days) [260° C./5 kg, cm$^3$/10 min] | n.m* | n.m* | n.m* | n.m* | n.m* | 47 | 11 | 14 | 48 | n.m* | n.m* |
| ESC rape oil 2.4% strain [time to fracture, hh:mm] | 00:02 | 00:00 | i.n.p.** | i.n.p.** | 00:02 | 00:21 | 09:17 | 09:37 | 00:05 | 00:13 | 00:01 |

All the tested compositions have a specific surface resistance of from $10^{13}$ to $10^{15}$, exhibit a markedly reduced tendency to attract dust as compared with comparable compositions that do not contain component C, and accordingly have sufficiently good antistatic properties.
*The rating "n.m" (not measurable) is given in the case of a ΔMVR value after storage of >100 ml/10 min
**The rating "i.n.p." means "injection moulding not possible"

As will be seen from Table 1, the examples according to the invention exhibit the desired property advantages. Without addition of component D, the composition has low heat distortion resistance, low-temperature strength, heat stability, poor stress cracking behaviour and, in particular, inadequate hydrolytic stability. By addition of components D1, D2, D3 or D5 in a specific concentration range, those properties are improved (Ex. 1 to 12). If, however, component D1, D2, D3 or D5 is not added in the amount according to the invention, the desired properties are not achieved either (Comp. 2, Comp. 4, Comp. 5, Comp. 10). If component D is not selected from the group of the substances according to the invention, there is likewise no improvement in the properties or poorer properties are even observed (Comp. 6-9 and Comp. 11-13).

The invention claimed is:
1. A polymer composition comprising
   A) at least one compound selected from the group consisting of polycarbonate, polyester and polyester carbonate,
   B) optionally at least one or more optionally rubber-modified vinyl (co)polymer,

C) at least one compound selected from the group consisting of polyether amides, polyester amides and polyether ester amides,
D) at least one compound selected from the group consisting of dihydrogen phosphates, wherein alkaline earth ions are used as a cation and monohydrogen phosphates, wherein alkali and/or alkaline earth ion are used as a cation,
and
E) optionally one or more further additives.

2. A composition according to claim 1, wherein
A) is present in an amount of from 10 to 100 parts by weight, based on the sum of components A and B,
B) is present in an amount of from 0 to 90 parts by weight, based on the sum of components A and B,
C) is present in an amount of from 0.5 to 20 wt. %, based on the total composition,
D) is present in an amount of from 0.001 to 3 wt. %, based on the total composition, and
E) is present in an amount of from 0 to 30 wt. %, based on the total composition, wherein the sum of the wt. % of components A and B in the total composition is calculated as the difference of 100 wt. % minus the sum of the wt. % of components C, D and E, and
wherein total composition is to be understood as meaning the sum of the wt. % of all the components A+B+C+D+E=100 wt. %.

3. A composition according to claim 1, wherein
A) is present in an amount of from 50 to 70 parts by weight, based on the sum of components A and B,
B) is present in an amount of from 30 to 50 parts by weight, based on the sum of components A and B,
C) is present in an amount of from 2 to 5 wt. %, based on the total composition,
D) is present in an amount of from 0.05 to 0.5 wt. %, based on the total composition, and
E) is present in an amount of from 0.3 to 5 wt. %, based on the total composition, wherein the sum of the wt. % of components A and B in the total composition is calculated as the difference of 100 wt. % minus the sum of the wt. % of components C, D and E, and
wherein total composition is to be understood as meaning the sum of the wt. % of all the components A+B+C+D+E=100 wt. %.

4. A composition according to claim 1, wherein
A) is present in an amount of from 10 to 100 parts by weight, based on the sum of components A and B,
B) is present in an amount of from 0 to 90 parts by weight, based on the sum of components A and B,
C) is present in an amount of from 0.5 to 20 wt. %, based on the total composition,
D) is present in an amount of from 0.01 to 3 wt. %, based on the total composition, and
E) is present in an amount of from 0 to 30 wt. %, based on the total composition,
wherein the sum of the wt. % of components A and B in the total composition is calculated as the difference of 100 wt. % minus the sum of the wt. % of components C, D and E, and wherein total composition is to be understood as meaning the sum of the wt. % of all the components A+B+C+D+E=100 wt. %.

5. A composition according to claim 1, wherein
A) is present in an amount of from 10 to 100 parts by weight, based on the sum of components A and B,
B) is present in an amount of from 0 to 90 parts by weight, based on the sum of components A and B,
C) is present in an amount of from 0.5 to 20 wt. %, based on the total composition,
D) is present in an amount of from 0.1 to 3 wt. %, based on the total composition, and
E) is present in an amount of from 0 to 30 wt. %, based on the total composition, and wherein the sum of the wt. % of components A and B in the total composition is calculated as the difference of 100 wt. % minus the sum of the wt. % of components C, D and E, and
wherein total composition is to be understood as meaning the sum of the wt. % of all the components A+B+C+D+E=100 wt. %.

6. A composition according to claim 1, wherein
A) is present in an amount of from 10 to 100 parts by weight, based on the sum of components A and B,
B) is present in an amount of from 0 to 90 parts by weight, based on the sum of components A and B,
C) is present in an amount of from 0.5 to 20 wt. %, based on the total composition,
D) is present in an amount of from 0.01 to 1 wt. %, based on the total composition, and
E) is present in an amount of from 0 to 30 wt. %, based on the total composition, wherein the sum of the wt. % of components A and B in the total composition is calculated as the difference of 100 wt. % minus the sum of the wt. % of components C, D and E, and
wherein total composition is to be understood as meaning the sum of the wt. % of all the components A+B+C+D+E=100 wt. %.

7. A composition according to claim 1, wherein component D is monopotassium dihydrogen phosphate.

8. A composition according to claim 1, wherein the specific electric surface resistance of the composition and components produced therefrom, measured according to IEC 60093, from $10^8$ to $10^{15}$ ohms.

9. A composition according to claim 1, having improved hydrolytic stability characterised by a change in the MVR ($\Delta$MVR), measured according to ISO 1133 at 260° C. with a die load of 5 kg, after storage of the granules for 7 days at 95° C. and 100% atmospheric humidity, of less than 50 ml/10 min.

10. A composition according to claim 1, wherein component E is present and comprises at least one component selected from the group consisting of flameproofing agents, antidripping agents, lubricants and demoulding agents, nucleating agents, stabilisers, fillers, reinforcing substances colourings and pigments.

11. A composition according to claim 1, wherein component A is polycarbonate.

12. A composition according to claim 1, wherein component B is present and comprises acrylonitrile-butadiene-styrene.

13. A composition according to claim 1, wherein component C is polyether amide.

14. A composition according to claim 1, wherein component E is present and comprises pentaerythritol tetrastearate or 2,6-di-tert-butyl-4-(octadecanoxycarbonylethyl)phenol.

* * * * *